United States Patent [19]

Schwab et al.

[11] 3,849,164

[45] Nov. 19, 1974

[54] PRESSURE-SENSITIVE RECORD UNIT COMPRISING A MIXTURE OF TWO CHROMOGENIC COMPOUNDS

[75] Inventors: Helmut Schwab, Dayton; Troy Eugene Hoover, Kettering; Chao-Han Lin, Dayton, all of Ohio

[73] Assignee: The National Cash Register Company, Dayton, Ohio

[22] Filed: May 9, 1972

[21] Appl. No.: 251,842

Related U.S. Application Data

[62] Division of Ser. No. 89,751, Nov. 16, 1970, abandoned.

[52] U.S. Cl............................ 117/36.8, 8/25, 8/39, 96/56.4, 96/56.5, 117/36.9, 260/335, 260/343.3, 260/343.4
[51] Int. Cl................................................ B41c 1/06
[58] Field of Search............... 117/36.2, 36.8, 36.9; 8/25, 39; 260/335, 343.3, 343.4; 96/56.4, 56.5

[56] References Cited
UNITED STATES PATENTS

| | | | |
|---|---|---|---|
| 2,424,954 | 7/1947 | Newman | 106/22 |
| 2,454,700 | 11/1948 | Holik | 106/22 |
| 3,442,908 | 5/1969 | Orita et al | 117/36.2 |
| 3,540,910 | 11/1970 | Lin | 117/36.2 |

*Primary Examiner*—William D. Martin
*Assistant Examiner*—Bernard D. Pianalto
*Attorney, Agent, or Firm*—E. Frank McKinney; Robert J. Shafer

[57] ABSTRACT

A pressure-sensitive record unit comprising: (a) a support sheet and (b) mark-forming components and a releasable liquid solvent for said mark-forming components arranged in contiguous juxtaposition and supported by said sheet. Said mark-forming components consisting essentially of a mixture of two chromogenic compounds of normally colorless form is disclosed, wherein the mixture, on reaction with an acidic material, exhibits a neutral-colored form. Examples of the first chromogenic compound include 2'-anilino-6'-diethylaminofluoran and 2'-(methoxymethyl)amino-6'-diethylaminofluoran and examples of the second chromogenic compound include 2'-chloro-6'-diethylamino-3'-methylfluoran and 2'-acetamido-6'-diethylaminofluoran.

13 Claims, 5 Drawing Figures

PRESSURE-SENSITIVE RECORD UNIT COMPRISING A MIXTURE OF TWO CHROMOGENIC COMPOUNDS

This is a division of application Ser. No. 89,751, filed Nov. 16, 1970 and now abandoned.

This invention relates to chromogenic compounds for use in pressure-sensitive record material. More specifically, this invention relates to mixtures of two chromogenic compounds which are substantially colorless in form when in liquid solution, but which are converted to neutral-colored forms upon reactive contact with acidic material.

The word "neutral," used with respect to this invention, means black, gray or some shade thereof, which exhibits no color hue. Throughout this application, it is to be understood that the dyes (chromogenic compounds) or mixtures thereof are substantially colorless until reacted with an acidic material.

Heretofore, some of the pressure-sensitive, mark-forming systems of the prior art employed fluoran dyes which are substantially colorless in form when in liquid solution, but which are converted to colored forms upon reactive contact with acidic material. Often, there are problems with the intensity of hue of these colored forms. For example, color instability on exposure to light frequently occurs, as well as reproduction capabilities when copied by xerographic or diazo processes. Generally, neutral-colored forms have excellent reproduction capabilities. Further, these neutral shades persist indefinitely in the dark and on fading the hue change is not significant.

It now has been found that colorless, but neutral colorable dye compositions are produced by admixing two chromogenic compounds. On reaction with an acidic material, the mixture yields a neutral-colored form. The first chromogenic compounds generally are green colorable fluoran dyes. These dyes usually exhibit two maximum light absorption peaks, the first peak reaching maximum between 400 –500 (wavelength given in millimicrons) and the second peak reaching maximum between 550 –650 . The second chromogenic compounds generally are red or pink colorable dyes. However, these dyes also can be purple or orange colorable dyes. These dyes usually exhibit one maximum light absorption peak, which reachs maximum between 500 –600 . It has been found that the combination of the first and second dyes provides approximately a straight line maximum light absorption peak throughout the visible range, and consequently, a neutral-colored appearance to the eye.

Pressure-sensitive, mark-forming systems of the prior art include a marking system of disposing on or within sheet support material, mutually reactant but unreacted mark-forming components and a liquid solvent in which each of the mark-forming components is soluble. The liquid solvent is present in such form that it is maintained isolated by a pressure-rupturable barrier from at least one of the mark-forming components until an application of pressure causes a breach or rupture of the barrier in the area delineated by the pressure pattern. The mark-forming components thereby are brought into reactive contact, producing a distinctive mark.

The mixtures of this invention having chromogenic properties can be incorporated in a web or coated onto the surface of a web to provide a manifolding unit which is useful in carrying out methods of marking involving reactive contact with a color-activating material to yield neutral-colored reaction products in areas where marking is desired.

The first chromogenic compound that is employed in this invention is represented by the formula:

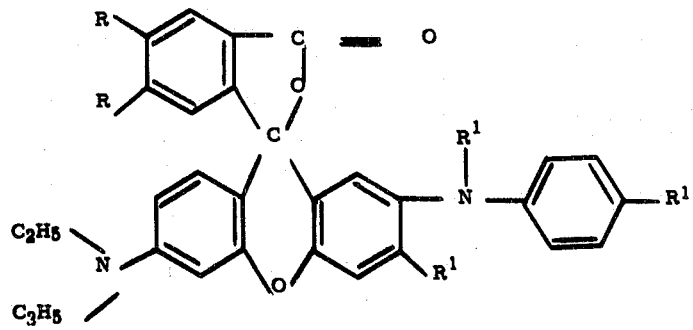

wherein each R is H or NO₂ and each R¹ is H, CH₃ or C₂H₅ or

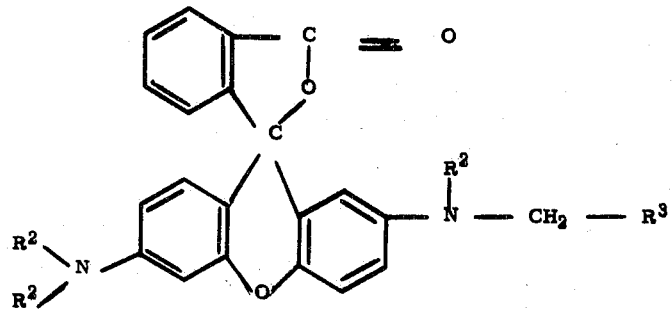

wherein each R² is H, CH₃ or C₂H₅ and R³ is H, 

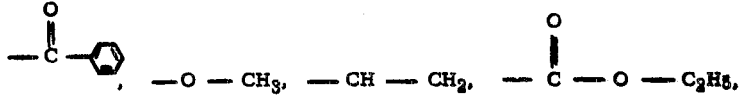

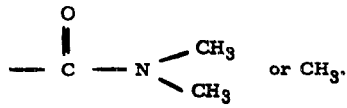

Specific examples of the first chromogenic compound are:

2' - anilino - 6' - diethylaminofluoran;
3' - diethylamino - 7' - (N-methylanilino) fluoran;
3' - diethylamino - 7' - (p-toluidino) fluoran;
3' - diethylamino - 6' - methyl - 7' - (p-toluidino) fluoran;
2' - anilino - 6' - diethylamino - 6 - nitrofluoran;
2' - anilino - 6' - diethylamino - 5 - nitrofluoran;
3' - diethylamino - 7' - (N-methylanilino) - 6 - nitrofluoran;
3' - diethylamino - 7' - (N-methylanilino) - 5 - nitrofluoran;
6' - diethylamino - 2' - methylaminofluoran;
2' - benzylamino - 6' - diethylaminofluoran;
2' - (N-acetonyl-N-methyl) amino - 6' - diethylaminofluoran;
2' - phenacylamino - 6' - diethylaminofluroan;
2' - (methoxymethyl) amino - 6' - diethylaminofluoran;
2' - allylamino - 6' - diethylaminofluoran;
2' - (N-carbethoxymethyl-N-methyl) amino - 6' - diethylaminofluoran;
2' - N - (dimethylaminoacetamido) amino - 6' - diethylaminofluroan;
2', 6' - bis(methylamino) fluoran;
2', 6' - bis(diethylamino) fluoran; and the like.

The second chromogenic compound that is employed in this invention is represented by the formula:

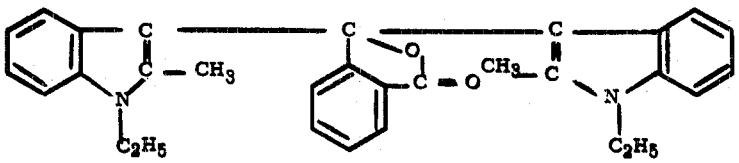

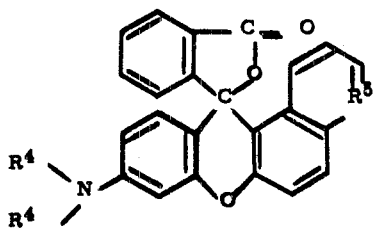

wherein each R⁴ is H, CH₃ or C₂H₅ and R⁵ is C or N;

wherein one R⁶ is 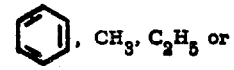 and the other R⁶ is H, 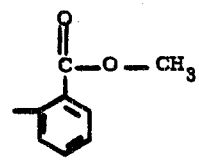, CH₃, C₂H₅ or

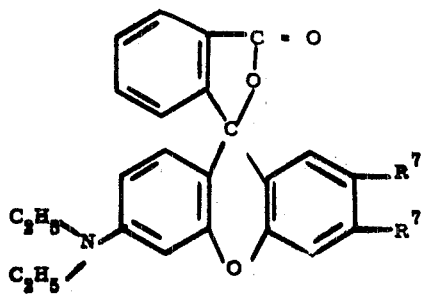

wherein each R⁷ is H, Cl, CH₃, C₂H₅ or — S — CH₃, or

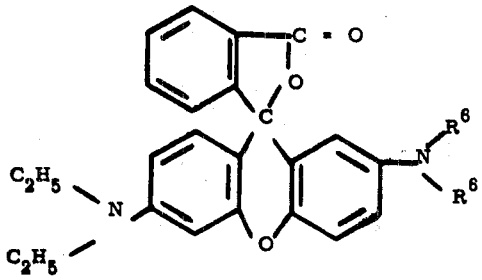

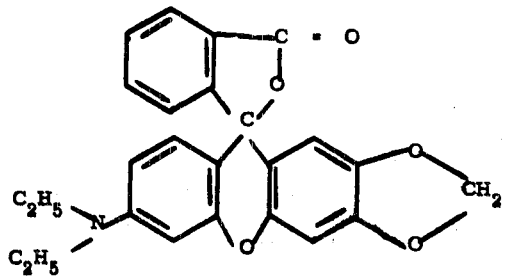

Specific examples of the second chromogenic compound are:
3,3-bis(1-ethyl-2-methyl-indol-3-yl) - phthalide;
3' - diethylamino - benzofluoran;
2' - chloro - 6' - diethylamino - 3' - methylfluoran;
6' - diethylaminofluoran;
2' - amino - 6' - diethylaminofluoran;
2' - (o-carbomethoxy) anilino - 6' - diethylaminofluoran
6' - diethylamino - 2', 3' - methylenedioxyfluoran;
6' - diethylamino - 2' - thiomethylfluoran;
2' - (N-acetyl)anilino - 6' - diethylaminofluoran;
2' - (N-acetyl-n-methyl)anilino - 6' - diethylaminofluoran;
2' - acetamido - 6' - diethylaminofluoran;
9 - ethylamino - spiro [12- H-benzo [a]xanthene - 12, 1' - phthalide];
9 - diethylamino - spiro [12- H-[1]-benzopyrano [3,2,f]-quinoline-12, 1' -phthalide];
6' - diethylamino - 3' - methyl - 2' - thiomethylfluoran, and the like.

The mole ratio of chromogenic compounds can vary widely. Specifically the mole ratio of first chromogenic compound to second chromogenic compound ranges from 1:5 to 5:1, preferably 1:1 to 5:1.

Specific examples of mixtures that have been prepared are:

minute pressure-rupturable microcapsules containing a solution of the substantially colorless, chromogenic mixtures. An acidic component, such as an acid clay or a phenolic polymeric material lies within the lower web or undersheet or upon the upper surface of the lower web or undersheet. A mark is made by the use of a stylus, a type character, or other pressure-exerting means applied to the two-sheet unit manifold.

The encapsulated solution is released on the event of rupture of the capsules in writing operations. The released solution is transferred from the overlying or base-sheet to the receiving surface of the underlying sheet in conformance with the pressure pattern of the writing operation. The top of the underlying sheet is coated or impregnated with a material reactant with the chromogenic mixture, e.g., an acid clay or an acidic phenolic polymer material; and the capsules are present on the overlying or base-sheet which capsules contain a liquid solution of the mixture of chromogenic materials. In another embodiment of the record material, however, the capsules can contain the polymeric phenolic material in liquid solution and the receiving surface of the underlying sheet can be supplied with the chromogenic mixture.

It is possible to incorporate the chromogenic mixture in a solid, crystalline state in a binder material so that the chromogenic mixture can be transferred from the

| FIRST CHROMOGENIC COMPOUND | SECOND CHROMOGENIC COMPOUND | MOLE RATIO OF FIRST TO SECOND |
|---|---|---|
| 6'-diethylamino-2'-methylaminofluoran | 3'-diethylamino-benzofluoran | 3.5:1 |
| 2'-benzylamino-6'-diethylaminofluoran | 3'-diethylamino-benzofluoran | 3.5:1 |
| 2'-(methoxymethyl)amino-6'-diethylaminofluoran | 3'-diethylamino-benzofluoran | 3.5:1 |
| 6'-diethylamino-2'-methylaminofluoran | 2'-chloro-6'-diethylamino-3'-methylfluoran | 3.5:1 |
| 2'-anilino-6-amino-6'-diethylaminofluoran | 6'-diethylaminofluoran | 3.5:1 |
| 3'-diethylamino-7'-(N-ethylanilino)fluoran | 2'-amino-6'-diethylaminofluoran | 1.5:1 |
| 2'-amilino-6'-diethylaminofluoran | 4:1 | |
| 3,3-bis(1-ethyl-2-methyl-indol-3-yl)- | phthalide | |
| 3'-diethylamino-7-(N-methylamino)fluoran | 2'-(o-carbomethoxy)anilino-6'-diethylaminofluoran | 1:5 |
| 6'-diethylamino-2'-methylamino-fluoran | 6'-diethylamino-2', 3'-methylene:dioxyfluoran | 4.0:1 |
| 6'-diethylamino-2'-methylamino-fluoran | 6'-diethylamino-2'-thiomethyl-fluoran | 4.0:1 |
| 6'-diethylamino-2'-methylamino-fluoran | 6'diethylaminofluoran | 4.0:1 |
| 6'-diethylamino-2'-methylamino-fluoran | 2'-(N-acetyl)-anilino-6'-diethylaminofluoran | 2.7:1 |
| 6'-diethylamino-2'-methylamino-fluoran | 2'-(N-acetyl-n-methyl)amino-6'-diethylamino-fluoran | 2.7:1 |
| 6'-diethylamino-2'-methylamino-fluoran | 2'-acetamido-6'-diethylamino-fluoran | 2.7:1 |
| 6'-diethylamino-2'-methylamino-fluoran | 9-ethylamino-spiro[12-H-benzo[a]xanthane-12,1'-phthalide] | 3.5:1 |
| 6'-diethylamino-2'-methylamino-fluoran | 9-diethylamino-spiro[12-H-[1]-benzopyrano[3,2,f]-quiniline-12,1'-phthalide] | 1.5:1 |
| 6'-diethylamino-2'-methylamino-fluoran | 6'-diethylamino-3'-methyl-2'-thiomethyl-fluoran | 1.5:1 |

The method of marking of this invention, i.e., the method of developing a neutral-colored material from substantially colorless or slightly colored chromogenic compounds, comprises providing a mixture of chromogenic compounds selected from among the above-mentioned compounds and bringing such mixtures into reactive contact with an acidic color-activating substance, in areas where marking is desired, to produce a neutral-colored form of the mixture by the action thereon of said acidic substance.

Acidic materials employed in this invention can be any compound within the definition of a Lewis acid, i.e., any electron acceptor. Preferably, acidic organic polymers such as phenolic polymers are employed as the acidic material.

The bottom surface of the overlying sheet is supplied on the surface or near the surface with a multiplicity of overlying sheet, upon the application of pressure, to deposit some of the chromogenic mixture on the receiving surface of the undersheet, which receiving surface carries a color-activating polymeric material. Preferably, the chromogenic mixture is dissolved in an appropriate solvent and minute droplets of the solution of the chromogenic mixture are encapsulated in minute, rupturable, capsules. It is apparent that many other arrangements are possible, including different configurations and relationships of the solvent and all of the mark-forming materials with respect to their encapsulation and location on the supporting underlying or overlying sheets or webs can be envisioned.

It is noted that the polymeric mark-forming components have a common solubility with the chromogenic mixture in at least one liquid solvent when the acid-reacting material is a phenolic or other acidic organic polymer. Several polymeric materials also can be reactively contacted with the mixture of chromogenic compounds.

As mentioned above, the solvent can be maintained in physical isolation in minute droplets until such time as it is released by application of pressure. This can be accomplished by several known techniques, but, preferably, isolation is maintained by encapsulation of individual droplets of the solvent in a microcapsule according to the procedures described, for example, in U.S. Pat. Nos. 2,712,507, issued July 5, 1955 on the application of Barrett K. Green; 2,730,457 issued Jan. 10, 1956 on the application of Barrett K. Green and Lowell Schleicher; 2,800,457 issued July 23, 1957 on the application of Barrett K. Green and Lowell Schleicher; 2,800,458 issued July 23, 1957 on the application of Barrett K. Green, reissued as Reissue Pat. No. 24,899 on Nov. 29, 1960; and 3,041,289 issued June 26, 1962 on the application of Bernard Katchan and Robert E. Miller. The microscopic capsules, when disposed within or upon a supporting web as a multiplicity in contiguous juxtaposition, are rupturable by pressure, such as normal marking pressure found, for example, in writing or typing operations.

The material or materials chosen as the wall material for the droplet-containing microcapsules, in addition to being pressure rupturable, must be inert or unreactive with respect to the intended contents of the capsules and the other mark-forming components so that the capsule wall material will remain intact under normal storage conditions until such time as it is released by an application of marking pressure. Preferred examples of eligible capsule wall materials include gelatin, gum arabic and many others thoroughly described in the aforementioned patents.

For most uses in record material, the capsule size does not exceed about 50 microns in diameter. Preferably, the capsules are smaller than about 15 microns in diameter.

The acidic organic polymeric material useful for developing the color of chromogenic mixtures in this invention include phenolic polymers, phenol acetylene polymers, maleic acid-rosin resins, partially or wholly hydrolyzed styrene-maleic anhydride copolymers and ethylene-maleic anhydride copolymers, carboxy polymethylene and wholly or partially hydrolyzed vinylmethylether-maleic anhydride copolymer and mixtures thereof.

More specifically, phenolic polymers found useful include alkyl-phenol acetylene resins, which are soluble in common organic solvents and possess permanent fusibility in the absence of being treated by crosslinking materials. Another specific group of useful phenolic polymers are members of the type commonly referred to as "novolacs," (a type of phenol-formaldehyde polymeric material) which are characterized by solubility in common organic solvents and which are, in the absence of cross-linking agents, permanently fusible. Resol resins, if they are still soluble, can be used, though they are subject to change in properties upon aging. Generally, phenolic polymer material found useful in practicing this invention is characterized by the presence of hydroxyl groups and by the absence of groups such as methylol, which tend to promote infusibility or cross-linking of the polymer, and further, by being soluble in organic solvents and relatively insoluble in aqueous media. Again, mixtures of these organic polymers and other acidic materials can be employed.

A laboratory method useful in the selection of suitable phenolic resins is the determination of the infrared absorption pattern. It has been found that phenolic resins which undergo absorption in the 3200 – 3500 cm$^{-1}$ region (which is indicative of hydroxyl groups) on the resin molecules and which do not absorb in the 1600 – 1700 cm$^{-1}$ region are eligible. This latter absorption region is indicative of desensitization of hydroxyl groups which desensitization renders such groups unavailable for reaction with the chromogenic materials.

The preparation of some organic polymeric materials useful for practicing this invention has been described in "Industrial and Engineering Chemistry," Volume 43, Pages 134 to 141, January 1951, and a particular polymer thereof is described in Example I of U.S. Pat. No. 2,052,093, issued to Herbert Honel on August 25, 1936. The preparation of the phenol-acetylene polymers has been described in "Industrial and Engineering Chemistry," Volume 41, Pages 73 to 77, January, 1949. The preparation of maleic anhydride copolymers is described in the literature, such as, for example, one of the maleic anhydride vinyl copolymers, as disclosed in "Vinyl and Related Polymers," by Calvin E. Schildknecht, Second printing, published April, 1959 by John Wiley & Sons, Incorporated: See pages 65 to 68 (styrene-maleic anhydride copolymer), 530 to 531 (ethylene-maleic anhydride copolymer), and 628 to 630 (vinylmethylethermaleic anhydride copolymer).

When the acidic material used as a mark-forming component in the present invention is one of the aforementioned organic polymers, the liquid solvent chosen must be capable of dissolving it. Examples are diphenyl ether, biphenyl, chlorinated biphenyl and saturated hydrocarbons. The solvent can be volatile or nonvolatile, and a single - or multiple-component solvent can be used which is wholly or partially volatile. Examples of volatile solvents useful in practicing the present invention include toluene, petroleum distillate, perchloroethylene, and xylene. Examples of nonvolatile solvents include high-boiling-point petroleum fractions and chlorinated biphenyls. Generally, the solvent chosen should be capable of dissolving at least about 0.3 percent, by weight, of the chromogenic mixture, and at least about 3 to 5 percent, by weight, of the acidic polymeric material to yield an effective reaction. However, in the preferred system, the solvent should be capable of dissolving an excess of the polymeric material, so as to provide every opportunity for utilization of the chromogenic mixture.

A further criterion for the selection of the solvent is that the solvent must not interfere with the mark-forming reaction. In some instances, the presence of the solvent interferes with the mark-forming reaction or diminishes the intensity of the mark, in which instances the solvent chosen is sufficiently volatile to assure its removal from the reaction site soon after having brought the mark-forming components into reactive contact so that the mark-forming reaction can proceed.

Since the mark-forming reaction requires that an intimate mixture of the components be brought about through solution of said components, one or more of the mark-forming components can be dissolved in solvent droplets isolated by encapsulation, the only requirement being that at least one of the components essential to the mark-forming reaction be maintained isolated until the mark-forming reaction is desired.

In the usual case, the mark-forming components are so chosen as to produce a mark upon application of pressure to a coated system of sheets at room temperature (20° to 25° centigrade). However, the present invention also includes a system wherein the solvent component is not liquid at temperatures near room temperature but is liquid and in condition for forming solutions only at elevated temperatures.

The support sheet member on which components of the system are disposed can comprise a single or a dual sheet assembly. In the case where all components are disposed on a single sheet, the record material is referred to as a "self-contained" or autogenous system. Where there must be a migration of solvent, with or without the mark-forming component, from one sheet to another, the record material is referred to as a "transfer" system. (Such a system may also be referred to as a "two-fold" system, in that at least two sheets are required and each sheet includes a component, or components, essential to the mark-forming reaction.) Where an adequate amount of the colored reaction product is produced in liquid or dissolved form on a surface of one sheet, a mark can be recorded on a second sheet by transfer of the reaction product.

In a preferred case, where microcapsules are employed, they can be present in the sheet support material either disposed therethroughout or as a coating thereon, or both. The capsules can be applied to the sheet material as a dispersion in the liquid vehicle in which they were manufactured, or if desired, they can be separated from the vehicle and thereafter dispersed in a solution of the acid-reacting polymeric component (for instance, 30 grams of water and 53 grams of a 1 percent, by weight, aqueous solution of polyvinylmethylether-maleic anhydride) to form a sheet-coating composition in which, because of the inertness of the solution and the capsules, both components retain their identity and physical integrity. When this composition is disposed as a film on the support material and dried, the capsules are held therein subject to release of the contained liquid by rupture of the capsule walls. The latter technique, relying on the inertness of the microcapsule and the dispersing medium of the film-forming mark-forming polymeric component, provides a method for preparing a sensitive record material coating having the capsules interspersed directly in a dry film of the polymeric material as the film is laid down from solution. A further alternative is to disperse one or more mark-forming components, and the chromogenic mixture containing microcapsules in a liquid medium not a solvent for either the mark-forming component or the microcapsules, with the result that all components of the mark-forming system are disposed on or within the support sheet in the one operation. Of course, the several components can be applied individually. The capsules also can be coated onto a sheet as a dispersion in a solution of polymeric material which is not necessarily reactive with the capsule-contained solution of the chromogenic mixture.

The respective amount of the several components can be varied according to the nature of the materials and the architecture of the record material unit desired or required. Suitable lower amounts include, in the case of the chromogenic mixture, about 0.005 to 0.075 pounds per ream (a ream in this application meaning five hundred (500) sheets of 25 × 38 inch paper, totaling 3,300 square feet); in the case of the solvent, about 1 to 3 pounds per ream; and in the case of the polymer, about 0.5 pounds per ream. In all instances, the upper limit is primarily a matter of economic consideration.

The slurry of capsules can be applied to a "wet" web of paper, for example, as it exists on the screen of a Fourdrinier paper machine, so as to penetrate the paper web a distance depending on the freeness of the pulp and the water content of the web at the point of application. The capsules can be placed directly in or on a paper or support sheet. Not only capsule structures, but continuous films which contain a multitude of microscopic, unencapsulated, droplets for local release in an area subjected to pressure can be utilized. (See for example, U.S. Pat. No. 2,299,694 which issued Oct. 20, 1942, on the application of Barrett K. Green.)

With respect to the acidic organic polymeric component, a solution thereof in an evaporable solvent can be introduced into an amount of water and the resulting mixture can be agitated while the evaporable solvent is blown off by an air blast. This operation leaves an aqueous colloidal dispersion slurry of the polymeric material, which can be applied to finished paper so as to leave a surface residue, or the slurry can be applied to finished paper so as to leave a surface residue, or the slurry can be applied to a "wet" web of paper or at the size-press station of a paper making machine. In another method for making a polymer-sensitized sheet, the water-insoluble polymer can be ground to a desired or required particle size in a ball mill with water, preferably with a dispersing agent, such as a small quantity of sodium silicate. If a binder material of hydrophilic properties is ground with the polymeric material, the binder itself may act as a dispersant. If desired, an amount of binder material of up to 40 percent, by weight, of the amount of polymeric material can be added to the ball-milled slurry of materials; — such binder materials being of the paper coating binder class, including, for example, gum arabic, casein, hydroxyethylcellulose, and latexes (such as styrenebutadiene copolymer). If desired, oil absorbents in the form of fuller's earths can be combined with the polymeric material particles to assist in retaining, in situ, the liquid droplets of chromogenic materials solution to be transferred to it in data-representing configuration, for the purpose of preventing "bleeding" of the print.

Another method for applying the chromogenic or polymeric material individually to a single sheet of paper is by immersing a sheet of paper in 1–10 percent, by weight, solution of the material in an evaporable solvent. Of course, this operation must be conducted individually for each reactant, because if the other reactant material were present, contact of the reactants would result in a premature coloration over the sheet area. A dried sheet with one component can then be coated with a solution of another component, the solvent of which is a non-solvent to the already supplied component.

The polymeric material can also be dissolved in ink composition vehicles to form a printing "ink" of colorless character and, thus, can be used to spot-print a proposed record-sheet-unit sensitized for recording, in a reaction-produced color in those spot-printed areas, by application of a solution of the chromogenic material. In the case of phenolic polymer, a printing ink may be made of up to 75 percent, by weight, of the phenolic polymeric material in a petroleum-based solvent; — the ink being built to a viscosity suitable for printing purposes. The relative amounts of reactive, mark-forming, components to be used in practice of this invention, are those most convenient and economical amounts consistent with adequate, desired or required visibility of the recorded data. The resolution of the recorded data is dependent on, among other things, particle or capsule size, distribution and amount of particles or capsules, liquid solvent migration, chemical reaction efficiency, and other factors, all of which can be optimized empirically by one skilled in the art.

In the system of this invention the acidic mark-forming material reacts with the chromogenic mixture to effect distinctive neutral color formation. In a multi-sheet system in which an acidic organic polymer is employed, it is desirable to include other materials to supplement the polymer reactants. For example, Kaolin can be added to improve the transfer of the liquid and/or the dissolved materials between the sheets. In addition, other materials, such as bentonite, attapulgite, talc, feldspar, halloysite, magnesium trisilicate, silica gel, pyrophyllite, zinc sulfate, calcium phosphate, calcium fluoride, barium sulfate and tannic acid can be included.

An example of the compositions which can be coated onto the receiving surface of an underlying sheet of a multi-sheet to react with a capsule on the underside of an overlying sheet is as follows:

| Coating Composition | Percent by Weight |
|---|---|
| Phenolic polymer mixture | 17 |
| Paper coating kaolin (white) | 57 |
| Calcium carbonate | 12 |
| Styrene butadiene latex | 4 |
| Ethylated starch | 8 |
| Gum arabic | 2 |
| | 100 |

The mixtures of this invention are described in greater detail in connection with the accompanying drawings, in which the maximum light absorption spectra of various first chromogenic compounds, second chromogenic compounds and neutral colorable mixtures thereof are illustrated.

Figure 1:
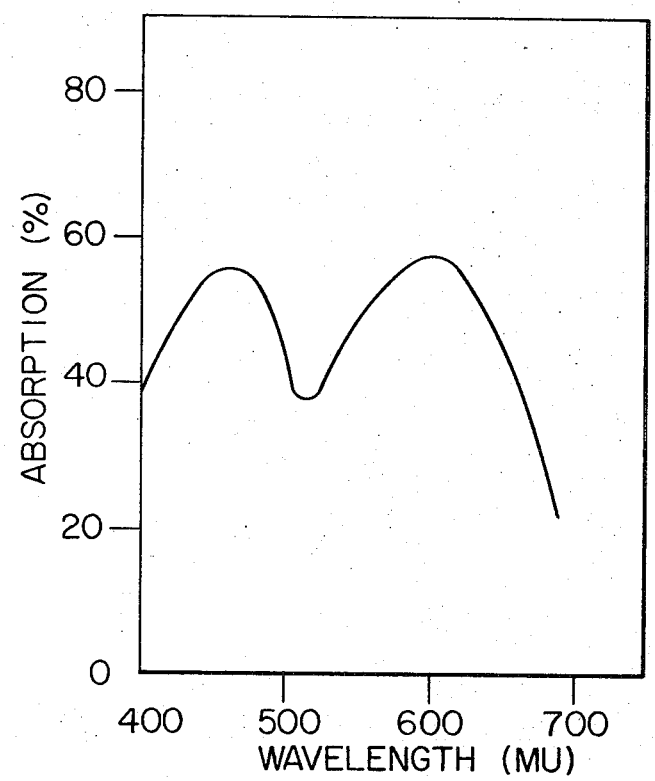
FIG. 1 illustrates the absorption spectra of 2' - anilino - 6' - diethylamino-fluoran, a green-colorable dye.
Figure 2:
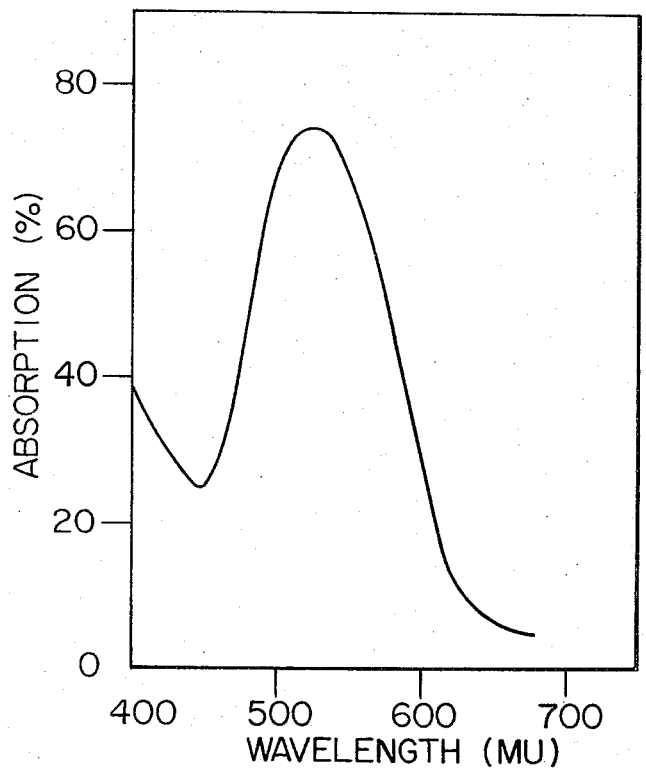
FIG. 2 illustrates the absorption spectra of 3,3-bis(1-ethyl-2-methyl-indol-3-yl)-phthalide, a red colorable dye.
Figure 3:
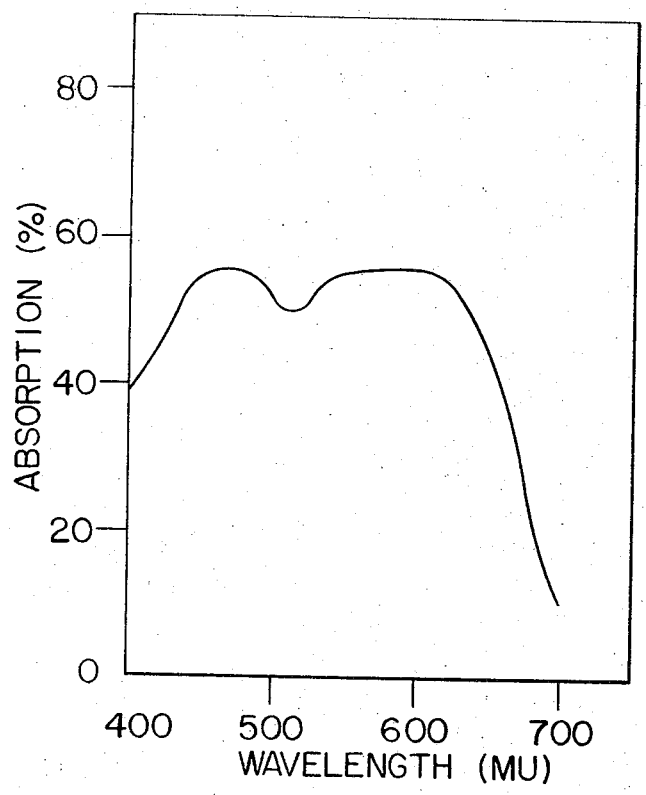
FIG. 3 illustrates the abosrption spectra of a mixture of 2'-anilino-6'-diethylamino-fluoran and 3,3-bis(1-ethyl-2-methyl-indol-3-yl)-phthalide, a neutral colorable dye.
Figure 4:
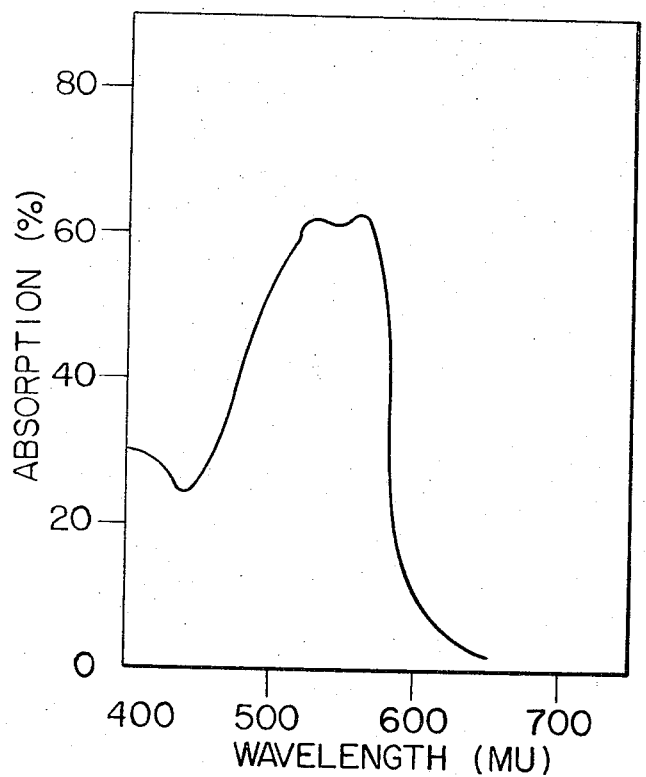
FIG. 4 illustrates the absorption spectra of 3'-diethylamino-benzofluoran, a red-colored dye.
Figure 5:
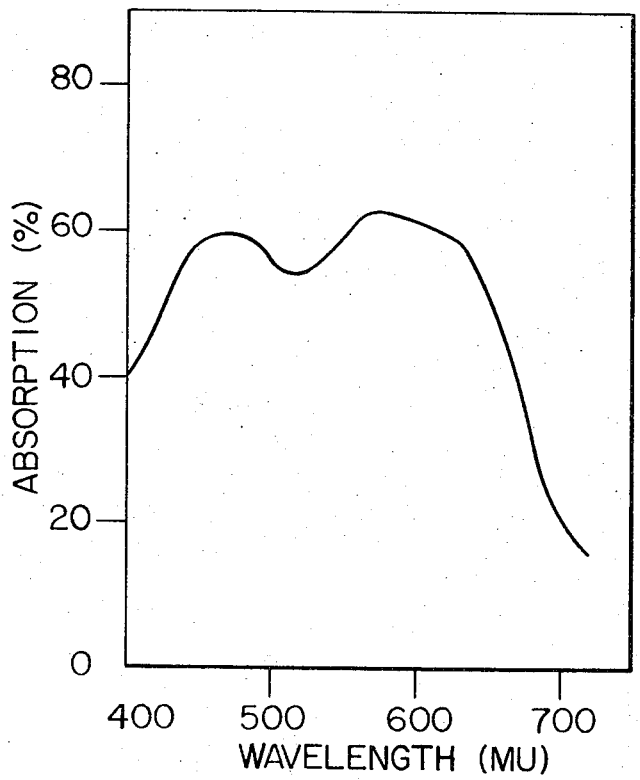
FIG. 5 illustrates the absorption spectra of a mixture of 2'-anilino-6'diethylamino-fluoran and 3'-diethylamino-benzofluoran, a neutral colorable dye.

The absorption spectra of a completely neutral colorable dye is substantially a straight line through the whole visible region of about 410 to 650, the heighth of the line depending upon the percent of absorption. The absorption spectras of the mixtures illustrated in FIGS. 3 and 5 are approximately the absorption spectra of a completely neutral colorable dye. These absorption spectras demonstrate how the two light absorption peaks of the first chromogenic compound are complemented by the absorption peak of the second chromogenic compound to result in a neutral-colorable mixture of dyes.

Having disclosed, generally, the mixtures of chromogenic compounds of this invention and preferred methods for utilizing the mixtures of chromogenic compounds, in combination with other materials, as reactive components in mark-forming record material; examples will now be disclosed wherein preparation of several of the mixtures of chromogenic materials is described.

EXAMPLE 1

Preparation of 6-amino-2'-anilino-6'-diethylaminofluoran

The preparation of the title compound involved three steps, viz., (1) the reaction of m-diethylaminophenol with 4-nitrophthalic anhydride to afford two isomeric benzophenones, which were separated to give the desired 2'-carboxy-4-diethylamino-2-hydroxy-5'-nitrobenzophenone, (2) the condensation of the said nitrobenzophenone with p-anilinophenol to yield 2'-anilino-6'-diethylamino-6'-nitrofluoran, and (3) the reduction of the nitrofluoran in question to 6-amino-2'-anilino-6'-diethylaminofluoran.

Forty and one-half grams of 4-nitrophthalic anhydride, 34.6g. of m-diethylaminophenol, and 300 ml. of benzene were refluxed for three hours, cooled, diluted with 200 ml. of benzene, and extracted with 150 ml. of 5% aqueous $Na_2CO_3$ solution twice. The alkaline extract was combined, washed with 500 ml. of benzene four times, diluted with 700 ml. of water and acidified to a pH of 2 to afford a precipitate, which was washed with water and air-dried. The precipitate was repeatedly digested with 300 ml. portions of hot benzene, and filtered, leaving an insoluble residue. The benzene solutions were combined, extracted with 100 ml. of 5% aqueous $Na_2CO_3$ solution twice; the combined alkaline extracts were washed with benzene and acidified to a pH of 2 to give 13.9 grams of the crude 2'-carboxy-4-diethylamino-2-hydroxy-5'-nitrobenzophenone. Further purification of the material entailed recrystallization from benzene, the pure product melting at 180°–181°C.

Eleven and one-tenth grams of 2'-carboxy-4-diethylamino-2-hydroxy-5'-nitrobenzophenone, 17.3 g. p-anilinophenol and 80 ml. of a mixture of equal volumes of oleum $SO_3$, 20%) and conc. $H_2SO_4$ were stined at 20°±1°C. for 15 hours, poured into 600 g. of ice, neutralized with 10% aqueous NaOH, yielding a semisolid, which solidified upon soaking in water. The solid was triturated with water, and the water removed by filtration. The residue was dissolved in benzene, and the solution washed with 10% aqueous NaOH followed by water. After being concentrated to about 100 ml., the benzene solution was chromatographed on activated alumina. The desired product, 2'-anilino-6'-diethylamino-6-nitrofluoran was eluted with benzene-ether-ethyl acetate (1:1:1), exhibiting a weight of 5.0 g.

Five grams of 2'-anilino-6'-diethylamino-6-nitrofluoran were dissolved in 70 ml. of chloroform, diluted with an equal volume of ethanol, and reduced with 11.1 g. of stannons chloride dihydrate in a mixture of 50 ml. of HCl (sp. gr. 1.14) and 10 ml. of water. The reaction mixture was basified with aqueous NaOH to a pH of about 14, and extracted with hot benzene. The benzene extracts were combined, washed with 10% aqueous NaOH followed by water, affording a crude product, weighing 4.7 g. The latter was chromatographed on activated alumina, and the desired material eluted with benzene-ether acetate (3:3:1), yielding 3.8 g., melting at 264°–266°C.

EXAMPLE II

Preparation of 3'-diethylamino-7'-(N-ethylanilino) fluoran

Three tenths of a gram of 2'-anilino-6'-diethylaninofluoran, 3 ml. of triethylphosphate, 1 ml. of ethyl iodide, and 0.1 g. of $Na_2CO_3$ were mildly heated in an open, small-necked flask that the temperature of the reaction mixture rose slowly. When it reached 140°C., the flask was allowed to cool to about 60°C., and after the addition of one more ml. of ethyl iodide, the heating was resumed until the temperature rose again to 140°C. Upon cooling, the reaction mixture was diluted with 50 ml. of benzene, washed with 10% aqueous NaOH followed by water, and concentrated to about 0.3 ml. under a reduced pressure. Repeated extractions of the solution with petroleum ether (low b.p.) gave a solid, weighing 0.3 g. The latter was chromatographed on activated alumina, and the desired product eluted with benzene-ether (3:1), affording 0.2 g., melting at 149°–151°C. Further recrystallization from benzene-petroleum ether yielded the pure 3'-diethylamino-7'-(N-ethylanilino) fluoran, melting at 158°–160°C.

EXAMPLE III

Preparation of 3,3-bis(1-ethyl-2-methylindol-3-yl)-Phthalide 1.54 grams of 1-ethyl-2-methyl-3-(2-carboxybenzoyl) indole, 0.8 gram of 1-ethyl-2-methylindole and 5 milliliters of acetic anhydride were placed in a 50 milliliter flask immersed in a waterbath maintained at 28°–32°C. for 5 hours. The precipitate formed was filtered, washed with ethyl ether, and purified. The product 3,3-bis(1-ethyl-2-methylindol-3-yl) phthalide, melted at 225°–227°C. A benzene solution of the said phthalide turned a red color when contacted with attapulgite clay coated on paper or with phenolic resin coated on paper.

What is claimed is:

1. A pressure sensitive record unit comprising:
   (a) support web or sheet material,
   (b) mark-forming components and a releasable liquid solvent for said mark-forming components arranged in contiguous juxtaposition and supported by said sheet material,
   (c) said mark-forming components consisting essentially of a mixture of two colorless but colorable chromogenic compounds wherein the first chromogenic compound has a generally green appearance and exhibitis two light absorption peaks—one in the range of 400 to 500 millimicrons and another in the range of 550 to 650 millimicrons—in its colored form and wherein the second chromogenic compound exhibits a single absorption peak in the range of 500 to 600 millimicrons in its colored form; the mixture, additionally, consisting essentially of a first chromogenic compound represented by the formula:

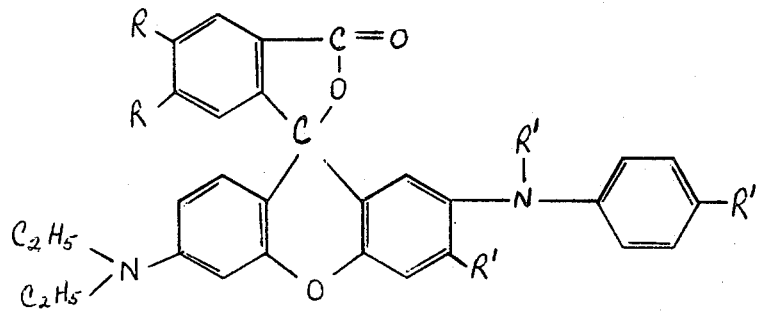

wherein each R is H or $NO_2$ and each $R^1$ is H, $CH_3$ or $C_2H_5$; or

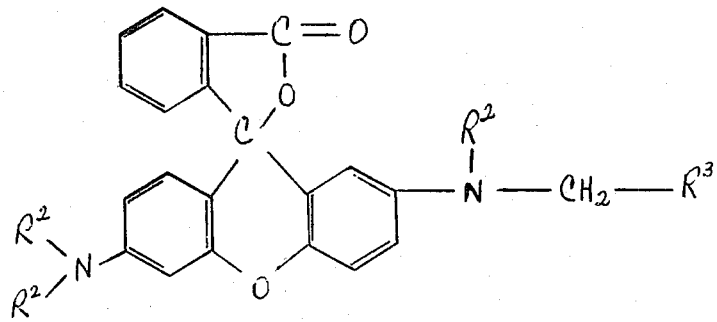

wherein each $R^2$ is H, $CH_3$ or $C_2H_5$ and $R^3$ is H, , $-\overset{O}{\underset{\|}{C}}-CH_3$, $-\overset{O}{\underset{\|}{C}}-$, $-O-CH_3$, $-CH=CH_2$, $-\overset{O}{\underset{\|}{C}}-O-C_2H_5$, $-\overset{O}{\underset{\|}{C}}-N\overset{CH_3}{\underset{CH_3}{\diagup}}$ or $CH_3$ and a second chromogenic compound represented by the formula:

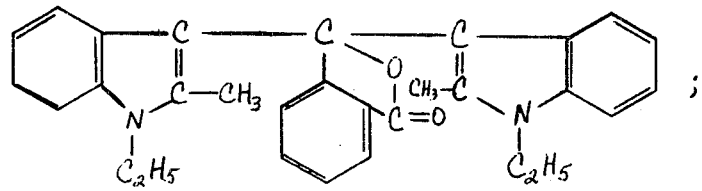

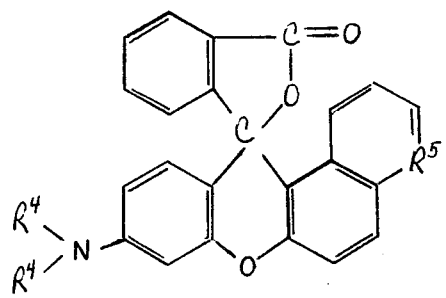

wherein each $R^4$ is H, $CH_3$ or $C_2H_5$ and $R^5$ is C or N;

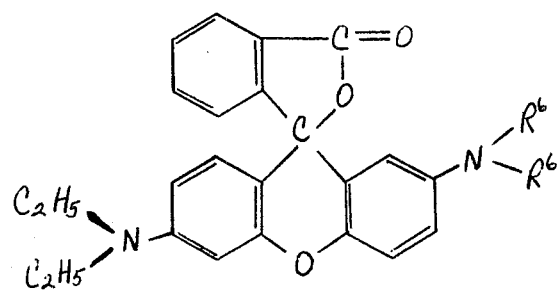

wherein one $R^6$ is $-\overset{O}{\underset{\|}{C}}-CH_3$, and the other $R^6$ is H, , $CH_3$, $C_2H_5$ or

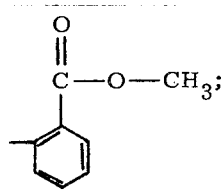

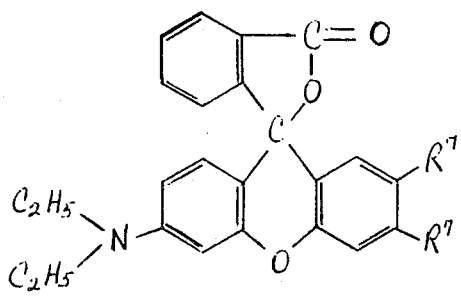

wherein each $R^7$ is H, Cl, $CH_3$, $C_2H_5$ or $-S-CH_3$; or

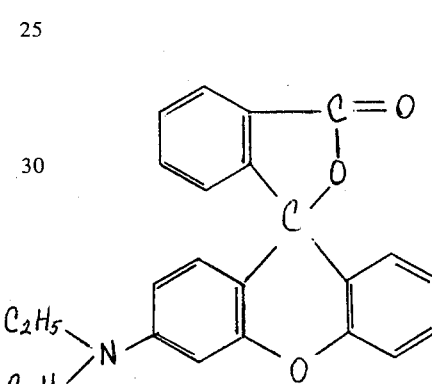

wherein the mole ratio of the first chromogenic compound to the second chromogenic compound ranges from 1:5 to 5:1 and said mixture, on reaction with an acidic material, exhibits a neutral-colored form; and an electron-accepting material of the Lewis acid type reactive with said mixture to produce a mark; which components upon pressure-release of the liquid solvent are brought into reactive contact in the released solvent.

2. The record unit of claim 1 where the electron-accepting material of the Lewis acid type comprises a clay.

3. The record unit of claim 1 where the electron-accepting material of the Lewis acid type comprises at least one organic polymer.

4. The record unit of claim 3 where the organic polymer is a phenolic polymer.

5. The record unit of claim 1 wherein at least one of the mark-forming components is maintained in isolation from the other mark-forming components prior to the release of the solvent.

6. The record unit of claim 1 wherein the liquid solvent is present as the nucleus of a microcapsule.

7. The record unit of claim 1 wherein the mixture is dissolved in the liquid solvent prior to pressure release.

8. The record unit of claim 1 wherein the mark-forming components and the liquid solvent are present in a single support sheet.

wherein each R is H or $NO_2$ and each $R^1$ is H, $CH_3$ or $C_2H_5$; or

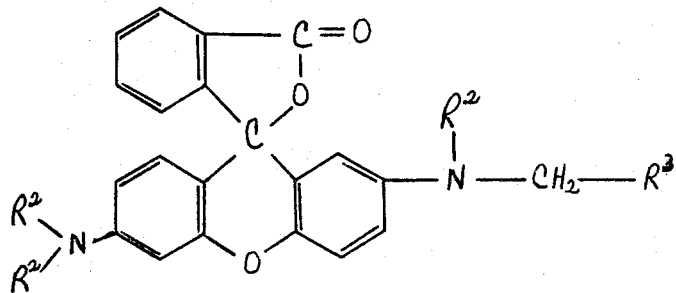

wherein each $R^2$ is H, $CH_3$ or $C_2H_5$ and $R^3$ is H, 

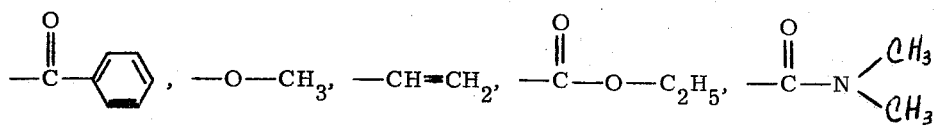

or $CH_3$ and a second chromogenic compound represented by the formula:

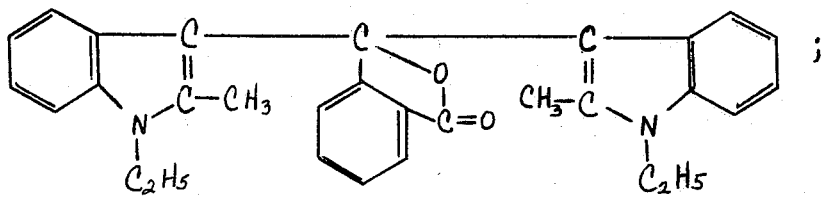

9. The record unit of claim 1 wherein at least one member selected from the group consisting of the mark-forming components and the liquid solvent is present in a support sheet other than the support sheet having the remaining members of the group.

10. A mark-forming unit, comprising: a first web or sheet having on one surface a transfer coating which contains as a finely dispersed phase a plurality of minute, pressure-rupturable capsules containing as an inner phase a solvent vehicle; a second web or sheet having an adherent coating upon its surface or dispersed within said web or sheet, said first and second webs or sheets being maintained disposed together in face-to-face relationship with said respective transfer and adherent coatings in contiguity with each other; a first coating constituent in the form of a mixture of only two colorless but colorable chromogenic compounds wherein the first chromogenic compound has a generally green appearance and exhibits two light absorption peaks—one in the range of 400 to 500 millimicrons and another in the range of 550 to 650 millimicrons—in its colored form and wherein the second chromogenic compound exhibits a single absorption peak in the range of 500 to 600 millimicrons in its colored form; the mixture, additionally, consistng essentially of a first chromogenic compound represented by the formula:

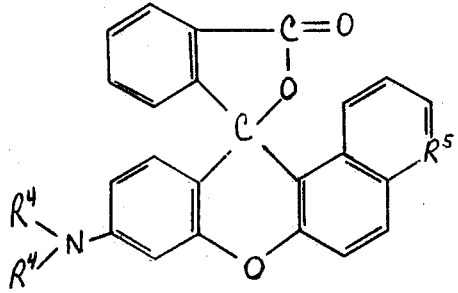

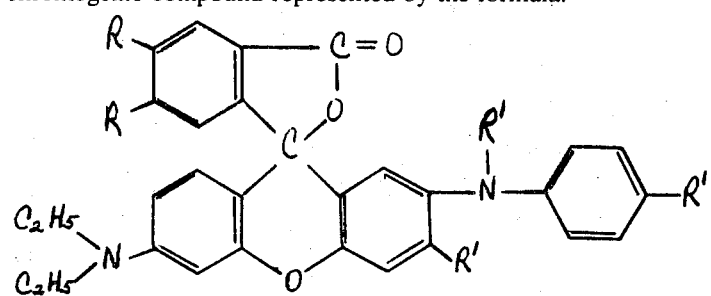

wherein each $R^4$ is H, $CH_3$ or $C_2H_5$ and $R^5$ is C or N;

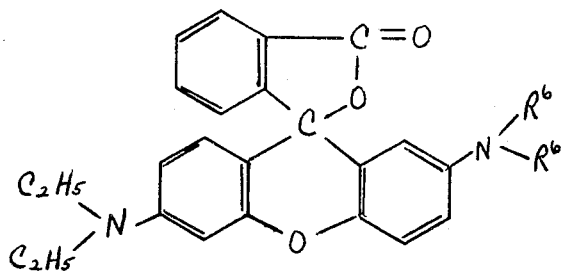

wherein one $R^6$ is 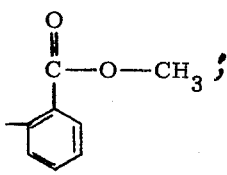, and the other $R^6$ is H, ⟨◯⟩, $CH_3$, $C_2H_5$ or

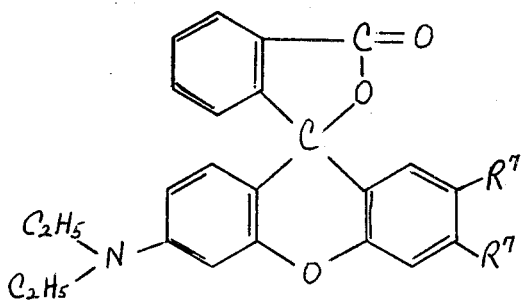

wherein each $R^7$ is H, Cl, $CH_3$, $C_2H_5$ or —S—$CH_3$; or

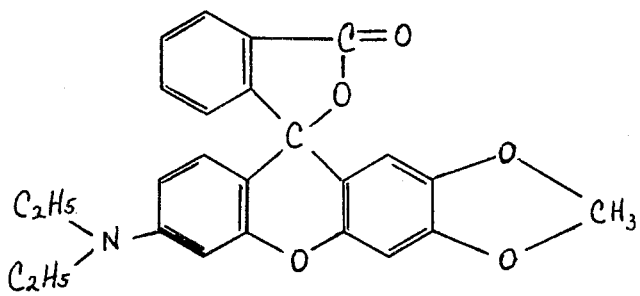

wherein the mole ratio of the first chromogenic compound to the second chromogenic compound ranges from 1:5 to 5:1 and said mixture, on reaction with an acidic material, exhibits a neutral-colored form; and a second constituent in the form of an electron-accepting material of the Lewis acid type; one of said constituents being dissolved in said solvent liquid vehicle present as the inner phase of the plurality of minute pressure-rupturable capsules in the transfer coating on or within said first web or sheet, and the other of said coating constituents being bonded to said second web in said adherent coating thereon but being accessible to other materials coming into contact with portions of the adherent coating, whereby, upon local impact and rupture of said capsules, releasing said liquid vehicle containing one coating constituent from at least some of the capsules onto said contiguous adherent coating, reactive contact is effected between said two constituents to produce a dark-colored material by the action of said electron-accepting material of the Lewis acid type upon said chromogenic material to effect color change in said chromogenic compound to said dark-colored material.

11. The mark-forming unit of claim 10 in which the electron-accepting material of the Lewis acid type comprises a clay.

12. The mark-forming unit of claim 10 in which the electron-accepting material of the Lewis acid type comprises an organic polymer.

13. The mark-forming unit of claim 12 in which the organic polymer is a phenolic polymer.

* * * * *